United States Patent
Sudhues et al.

(10) Patent No.: US 12,514,161 B2
(45) Date of Patent: Jan. 6, 2026

(54) DRAPER HEAD WITH RETROFITTING INTERFACE TO AN AIR CONVEYING SYSTEM

(71) Applicant: Carl Geringhoff GmbH & Co. KG, Ahlen (DE)

(72) Inventors: Steffen Sudhues, Ahlen (DE); Christoph Hartmann, Ennigerloh (DE); Michael Pokriefke, Hude (DE)

(73) Assignee: Carl Geringhoff GmbH & Co. KG, Ahlen (DE)

( * ) Notice: Subject to any disclaimer, the term of this patent is extended or adjusted under 35 U.S.C. 154(b) by 664 days.

(21) Appl. No.: 17/965,811

(22) Filed: Oct. 14, 2022

(65) Prior Publication Data
US 2023/0124269 A1    Apr. 20, 2023

(30) Foreign Application Priority Data
Oct. 14, 2021 (DE) ..................... 10 2021 126 683.1

(51) Int. Cl.
    *A01D 57/10*      (2006.01)
    *A01D 57/20*      (2006.01)

(52) U.S. Cl.
    CPC .............. *A01D 57/10* (2013.01); *A01D 57/20* (2013.01)

(58) Field of Classification Search
CPC ........ A01D 57/10; A01D 57/20; A01D 34/40; A01D 41/142
See application file for complete search history.

(56) References Cited

U.S. PATENT DOCUMENTS

| | | | | |
|---|---|---|---|---|
| 859,602 A * | 7/1907 | Green | ..................... | A01D 34/30 56/219 |
| 1,917,604 A * | 7/1933 | Scranton, Jr. | .......... | A01D 34/13 56/298 |
| 2,670,586 A * | 3/1954 | Phillips | .................. | A01D 57/10 56/158 |
| 2,718,744 A * | 9/1955 | Phillips | .................. | A01D 57/10 56/158 |
| 2,734,331 A * | 2/1956 | Phillips | .................. | A01D 57/10 56/158 |
| 2,737,006 A * | 3/1956 | Klingler | ................. | A01D 57/10 37/447 |
| 2,832,187 A * | 4/1958 | Johnson | ............. | A01D 41/1252 56/220 |
| 3,165,874 A * | 1/1965 | Osteen | .................... | A01D 57/10 56/12.9 |

(Continued)

FOREIGN PATENT DOCUMENTS

| | | | | |
|---|---|---|---|---|
| CA | 1311363 C | * | 12/1992 | ............. A01D 57/02 |
| DE | 2808243 A1 | * | 8/1979 | ........... A01D 41/147 |

(Continued)

*Primary Examiner* — Arpad Fabian-Kovacs
(74) *Attorney, Agent, or Firm* — Gudrun E. Huckett

(57) ABSTRACT

A draper head (2) for attachment to a harvesting machine (4) is provided. In order to be able to effortlessly equip the draper head (2) with an active fan, with which grains and ears of corn are blown in the direction of the belt conveyor device (12) in the region of the blade bar (8), a retrofitting interface (18) is provided, at which either a closed cover profile sheet (26) or an angle profile sheet (50) that is provided with air outlet openings (52) can be installed in the installation space (20).

9 Claims, 6 Drawing Sheets

(56) References Cited

U.S. PATENT DOCUMENTS

| | | | | |
|---|---|---|---|---|
| 3,555,790 | A * | 1/1971 | Quick | A01D 57/10 56/14.4 |
| 4,783,951 | A * | 11/1988 | Richards | A01D 57/10 56/12.9 |
| 4,866,919 | A * | 9/1989 | Brooks | A01D 57/10 56/12.9 |
| 7,412,816 | B2 * | 8/2008 | Coers | A01D 57/20 56/208 |
| 7,591,127 | B1 * | 9/2009 | Stacer | A01D 65/00 56/12.9 |
| 8,322,520 | B2 * | 12/2012 | Dow | A01D 61/002 56/181 |
| 9,480,203 | B2 * | 11/2016 | Cavkusic | A01D 57/01 |
| 2009/0199529 | A1 | 8/2009 | Schroeder | |
| 2015/0373910 | A1 | 12/2015 | Surmann et al. | |
| 2016/0316620 | A1 * | 11/2016 | Allochis | A01D 34/04 |
| 2017/0295722 | A1 | 10/2017 | Busser et al. | |
| 2018/0368320 | A1 | 12/2018 | Schulze Selting et al. | |
| 2021/0204479 | A1 | 7/2021 | White et al. | |

FOREIGN PATENT DOCUMENTS

| | | | | |
|---|---|---|---|---|
| DE | 4240319 A1 * | 6/1994 | | A01D 57/10 |
| DE | 10 2015 110 746 | 1/2017 | | |
| WO | WO-2017005343 A1 * | 1/2017 | | A01D 41/14 |

* cited by examiner

DRAPER HEAD WITH RETROFITTING INTERFACE TO AN AIR CONVEYING SYSTEM

BACKGROUND OF THE INVENTION

The present invention relates to a draper head for attachment to a harvesting machine, comprising a frame, a blade bar, a blade angle construction for holding the blade bar, belt conveyor devices for conveying the cut stalk material away, with a support device, and drive devices for driving the blade bar and the belt conveyor devices.

A generic draper head is known from published document US 2018/0368320 A1. The cut stalk material is deposited by the reel on the endlessly circulating conveyor belts. These bring the cut harvested crop together centrally, from where the crop is transported backwards with the central belt in the direction toward a feed conveyor of a combine harvester and transferred to it.

Published document DE 10 2015 110 746 A1 discloses a draper head with a permanently integrated air conveying system. The draper head disclosed therein has air outlet openings which are arranged in the front region of the draper head and here in particular in the region of the step between the blade bar and the top of the belt conveyor device. The air flow is generated by several fans located at the rear of the draper head. The air flow is supplied from a fan to the air outlet openings associated with this fan via feed lines which open into an air duct which extends across the working width of the draper head and is arranged in the front region of the draper head. The air conveying system with the air flow emerging from the air outlet openings was specially developed for harvesting sensitive crops that grow close to the ground. Due to the controlled air outlet on the blade bar, individual grains, ears of corn or pods of the harvested crop are gently blown onto the belt conveyor and can no longer roll off the draper head from there. Yield losses possibly occurring without the additional air conveying impulse are reduced in this way.

The manufacture of the draper head with the additional air conveying system is expensive because the components for the air conveying system are special components that are expensive to manufacture and assemble. The air duct is designed, for example, as a closed box profile with air outlet openings formed therein, to which the blade bar is attached. Due to the many special parts, the generic draper head is a separate type of draper head that must be taken into account separately in production, logistics, and technical documentation.

It is the object of the present invention to reduce the complexity of a draper head provided with an air conveying system and to reduce the manufacturing costs.

SUMMARY OF THE INVENTION

The object is achieved for a draper head of the aforementioned kind in that a retrofitting interface is formed above the blade angle construction, in which an angle profile sheet or a cover profile sheet can be releasably installed in an installation space provided for this purpose via identical connection points, with a cavity being located below the angle profile sheet and the cover profile sheet, respectively, which space serves as an air duct when the angle profile sheet is used, wherein the angle profile sheet delimits air outlet openings which are arranged and designed in such a way that they direct an air flow exiting from the air duct through the air outlet openings in the direction of the upward-facing surface of the belt conveyor devices, into a space located above and/or or directed in an upward direction, and wherein the cover profile sheet is designed so that it covers the cavity in a closed manner.

The retrofitting interface makes it possible to easily equip a conventional draper head with an air conveying system. It is possible to retain the blade angle construction for mounting the blade bar of a conventional draper head even when the conventional draper head is to be equipped with an air conveying system. The blade angle construction is usually very stable so that it is not damaged even when the blade bar hits the ground or obstacles such as stones. It can now also be retained in the same way when a draper head is to be provided with an air conveying system. In such a case, it is sufficient to use the angle profile sheet in the installation space of the retrofitting interface instead of a cover profile sheet covering the cavity. It is possible to initially only produce and store trunk machines, which have to be finally equipped according to the final specification desired by the respective customer only shortly before delivery. This increases flexibility in production and sales planning.

The angle profile sheet is a sheet part that can be produced inexpensively and at least partially delimits the cavity and thus also the air duct with its legs. Since the angle profile sheet no longer has to fulfill any static tasks for holding the blade bar, the angle profile sheet can be made considerably lighter and cheaper.

The cover profile sheet can however also be produced inexpensively, since it only has the function of covering the retrofitting interface with the blade angle construction located underneath. Since the transition region from the blade bar to the surface of the belt conveyor device should be designed as smooth and free of obstacles as possible in order to ensure a good transfer of the crop from the blade bar to the belt conveyor device, a well-designed cover sheet is required there anyway to cover the blade angle construction. In the case of the conventional draper heads without an air conveying system, the design of the retrofitting interface therefore entails at most a small additional effort. In return, there is no need to produce a separate type of draper head when it is to be equipped with an air conveying system.

Connection points are provided for fastening the angle profile sheet and the cover profile sheet in the region of the blade angle construction, which points can be used in the same way for both profile sheets. The connection points should be designed to be detachable, so that even after the manufacture of a complete draper head, it is possible to retrofit it easily with an air conveying system, or to dismantle the air conveying system in order to be able to operate the draper head in the conventional way. The connection points can be designed as screw mounts, clip and/or clamp mounts, bayonet locks, slot guides with locking and the like. As a result, the retrofitting is possible with little expenditure of time and, if necessary, even without tools.

An angle profile sheet that is easy to attach and remove is also advantageous in that the air duct can be cleaned quickly and easily. When using a draper head with a fan, air is drawn in from the vicinity of the draper head; it is inevitable that harvested crop residues transported in the air flow will also be drawn in. These crop residues drawn in by the fan can collect in the air duct and also clog the air outlet openings from the inside. In an air duct designed as a closed box portion with air outlet openings, the air outlet openings are difficult to access from the inside over the length of the box portion. This is much easier when an angle profile sheet has been removed from the draper head. After dismantling, the angle profile sheet can be quickly blown clean with an air pressure cleaner on its side facing the cavity. In the same way, also the cavity covered by the angle profile sheet can be blown clean quickly and easily because it is then easily accessible. The long-term operational reliability of the air conveying system is significantly improved by the reduced maintenance effort.

If in the present description the terms "front" and "rear" are mentioned, this refers to the working direction of the draper head attached to a harvesting machine. "Front" is the direction in which the harvesting machine drives into the existing stand of crop to be harvested, this is also the working direction. "Rear" is the opposite of this direction. Insofar as profile sheets are mentioned in this description, they do not necessarily have to be made of metal; other materials are also possible, such as a fiber-reinforced or a conventional plastic material.

According to an embodiment of the invention, the blade angle construction has a cross member which is connected to at least one support arm connected to the frame; the cross member has an end wall pointing with its flat side in the working direction of the draper head and folded over at its upper end counter to the working direction of the draper head and guided so far to the rear that it overlaps the front edge of the upper run of the belt conveyor device running behind the end wall; a mounting plate is fastened to the front side of the end wall and extends in an at least approximately horizontal direction and the blade bar is fixed to the front end thereof; the end wall has at least one opening into which a longitudinal tube is inserted, which extends from the rear frame to the end wall; the opening is formed in the end wall above the mounting plate; and the end wall located above the mounting plate and the upward-facing side of the mounting plate spatially delimit the region of the retrofitting interface.

The proposed design and arrangement of the components of the blade angle construction enables a high-strength, yet comparatively light design of the blade angle construction, which provides both a stable substructure for fastening and holding the blade bar and forms a spatial limitation of the retrofitting interface. Additional components are not required for this. Both the angle profile sheet and the cover profile sheet are well supported in their mounting position by the mounting plate in downward direction. The end wall forms a second support, via which the angle profile sheet or the cover profile sheet is well supported at its rear end, respectively. The connection points can be formed on the end wall and/or the mounting plate, via which the angle profile sheet and the cover profile sheet are connected to the draper head. When the longitudinal tubes, which are each inserted into an outlet opening, are used as the respective air duct of the air conveying system, to which a fan of the air conveying system is connected, the outlet openings are also already integrated into the retrofitting interface without the need to convert the components of the retrofitting interface. Irrespective of the question of whether the longitudinal tubes are used as air ducts, they at least connect the blade angle construction to the rear frame of the draper head, which in any case improves the support of the blade angle construction on the rear frame. The support arm can be movably or rigidly connected to the rest of the frame of the draper head.

According to an embodiment of the invention, the angle profile sheet and the cover profile sheet are held in their respective mounting position via the connection points with their front lower end in a region between the rear end of the blade bar and the end wall, resting sealingly on the upper side of the mounting plate; they extend from there to at least approximately the maximum height of the end wall and, viewed in the longitudinal direction opposite to the working direction of the draper head, up to at least approximately the end wall or overlap the end wall. Due to the sealing contact of the profile sheets on the upper side of the mounting plate, no crop can build up there, get caught on components and thus disturb the crop flow. When the angle profile sheet is mounted on the retrofitting interface, the sealing contact on the top of the mounting plate also means that there is no pressure loss in the air flow due to escaping compressed air. For the sealing contact, the respective profile sheet can be designed in such a way that one leg rests plane-parallel in one portion on the upper side of the mounting plate. This plane-parallel leg is also well suited to be connected to the blade angle construction via one or more connection points. Due to the larger contact surface of a resting leg, a better sealing effect results with respect to an only abutting end face of a leg.

According to an embodiment of the invention, the angle profile sheet in its mounted position encloses the cavity in the working direction, the cavity is sealed at its end faces with sealing bodies covering the cross section of the angle profile sheet at its end faces to the outside, and the cavity is at least portion-wise delimited by the end wall and the mounting plate downwardly and rearwardly. In this configuration, the angle profile sheet only has to delimit the cavity and thus the air duct at the front and at the top. The air duct is sealed by the sealing bodies on the sides of an angle profile sheet, and the end wall and the mounting plate are used as components of the blade angle construction for enclosing the cavity and thus the air duct downwardly and rearwardly. The construction effort for the production of an air duct is thereby minimized.

According to an embodiment of the invention, in its mounting position, the rear end of the angle profile sheet overlaps the upper edge of the end wall and air outlet openings are formed in the portion overlapping the end wall. Due to the design of the air outlet openings in the upper region of the angle profile sheet, the air flow from the air conveying system emerges from the air duct exactly where crop material is to be prevented from falling forward from the belt conveyor devices. Since the air flow has its highest flow speed in the region of the outlet openings, it transports crop components most effectively here in the direction of the belt conveyor device. The rear end of the angle profile sheet can be extended so far rearward that in one portion it runs at a distance and at least approximately parallel to the portion of the end wall that is folded over at its upper end opposite to the working direction of the draper head and is extended so far rearwards that it overlaps the front edge of the upper run of the belt conveyor device circulating behind the end wall. This creates a flow duct for the air flow between the angle profile sheet and the portion of the end wall folded over toward the rear, in which the air flow is aligned and focused in the direction of flow.

According to an embodiment of the invention, the angle profile sheet has a bead on its side pointing in the working direction, which extends over the length of the angle profile sheet and the bottom of which is lower in the mounting position of the angle profile sheet than a portion of the angle profile sheet that is located adjacent in the working direction. In this configuration, the bead forms a collection zone in which harvested crop can be caught that slides down the side of the angle profile sheet pointing in the working direction and threaten to fall onto the ground in front of the blade bar. The harvested crop caught in the bead can then be entrained onto the adjacent belt conveyor device by following harvested crop sliding over the angle profile sheet so that it does not constitute a loss.

According to an embodiment of the invention, connection points in the region of the bead are designed in such a way that a clamping piece is placed on a stationary bolt and clamped onto the cover profile sheet or the angle profile sheet from the outside with a clamping screw, wherein the peripheral contour of the clamping piece is adapted to the three-dimensional shape of the bead. The clamping piece can in particular consist of a flexible material, such as a rubber or a polymeric material.

According to an embodiment of the invention, the longitudinal tubes have connecting pieces through which an air flow generated by a fan can be introduced into the interior of the longitudinal tubes, and the longitudinal tubes are therefore a component of the air conveying system in that they direct the air flow introduced through their interior to the region of the outlet opening in the blade angle construction, and the longitudinal tubes simultaneously form a part of the support device for supporting the belt conveyor device, in that slide strips are placed on the longitudinal tubes, which extend in a direction transverse to the working direction of the draper head and over which the upper run of the belt conveyor slides in its circulation. The longitudinal tubes are also permanently installed in the conventional draper head and are in any case a component of the support device for supporting the belt conveyor device. When the cutting unit is to be equipped with an air conveying system, the longitudinal tubes form the air ducts with which the air flow generated by a fan is conveyed from a region behind the draper head into the region of the blade angle construction. In order to equip a conventional draper head with an air conveying system, it is therefore no longer necessary to install separate air ducts in the draper head. Rather, it is sufficient to mount the connecting pieces on the longitudinal tubes and to connect them to the fans to be additionally mounted. This minimizes the retrofitting effort.

Further features of the invention emerge from the claims, the figures and the description of the subject matter. All features and feature combinations mentioned above in the description and the features and feature combinations mentioned below in the description of the figures and/or exclusively shown in the figures can be used not only in the combination specified, but also in other combinations or on their own.

BRIEF DESCRIPTION OF THE DRAWINGS

The invention will now be explained in more detail using a preferred exemplary embodiment and with reference to the accompanying drawings.

DESCRIPTION OF PREFERRED EMBODIMENTS

Figure 1:
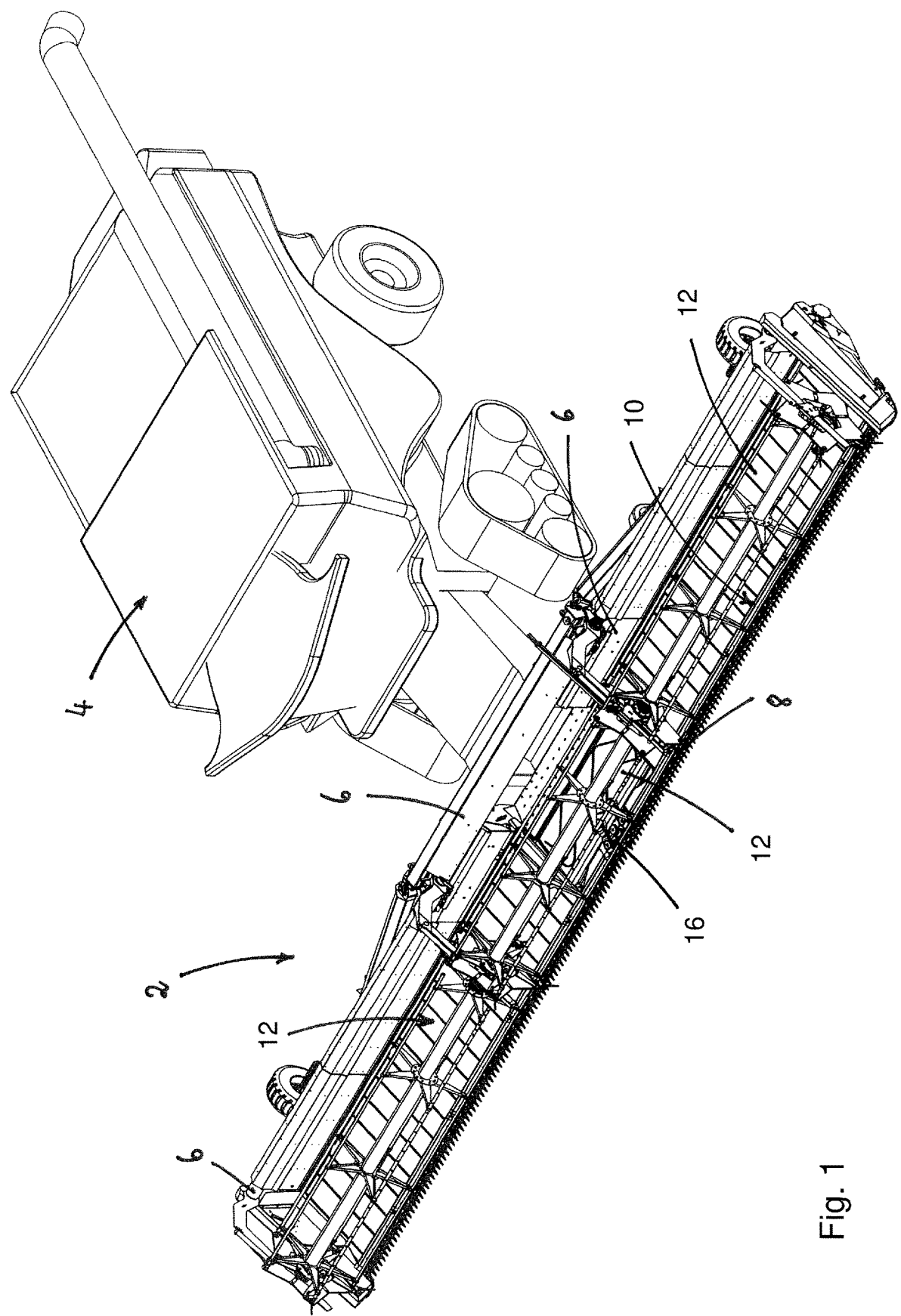
FIG. 1 shows a view of a harvesting machine with a draper head in an oblique view from above.

FIG. 1 shows a view of a harvesting machine 4 with a draper head 2 in an oblique view from above. The draper head 2 has a frame 6 which supports the overall structure. At the front end of the draper head 2 there is a blade bar 8 with which the crop is cut. The blade bar 8 is attached to a blade angle construction 10, which is shown in more detail in FIG. 2. The cut harvested crop is thrown onto the belt conveyor devices 12 and is first gathered in the middle by them, after which it is then delivered to the rear to the harvesting machine 4. Beneath the upper run of the belt conveyor devices 12, a support device 14 is arranged, which is however not shown in FIG. 1.

Figure 2:
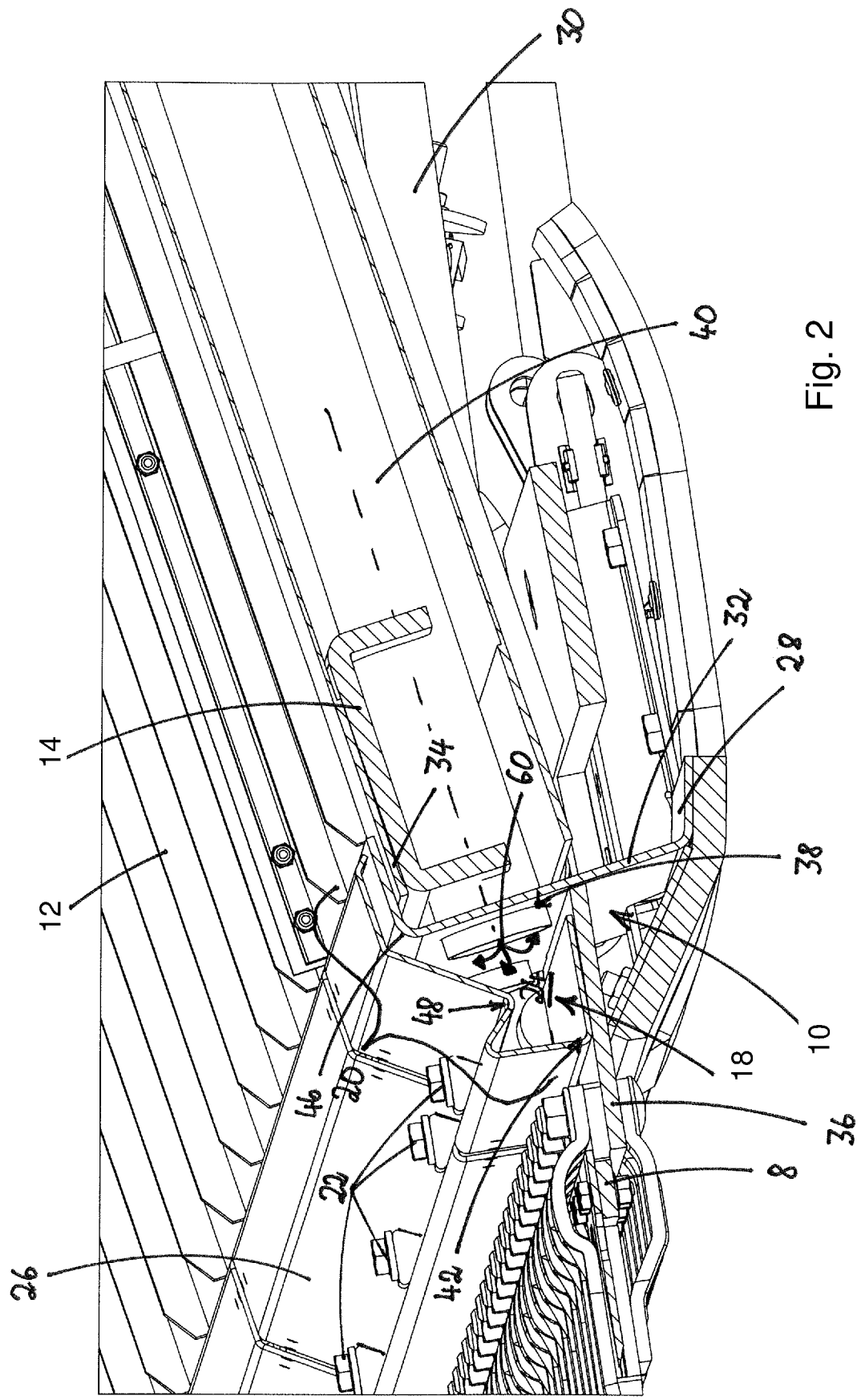
FIG. 2 shows a sectional view of a draper head in the region of the blade angle construction.

FIG. 2 shows a sectional view of a draper head 2 in the region of the blade angle construction 10. The retrofitting interface 18 is in the region of the blade angle construction 10. In the exemplary embodiment shown in FIG. 2, a cover profile sheet 26 is arranged in the installation space 20, wherein the cover profile sheet is detachably connected at connection points 22 with the blade angle construction 10 via screw connections. The cover profile sheet 26 delimits a cavity 24 toward the front and the top. The cover profile sheet 26 is closed at the front and at the top. To the rear, the cavity 24 is limited by the end wall 32 of the cross member 28, which is held on a support arm 30. The support arm 30 is connected to the frame 6 at its rear end.

The end wall 32 of the cross member 28 points with its flat side in the working direction of the draper head 2. The end wall 32 is bent over at its upper end opposite to the working direction of the draper head 2 and is extended so far to the rear with the leg designed in this way that this leg overlaps the front edge 34 of the upper run of the belt conveyor device 12 circulating behind the end wall 32.

On the front side of the end wall 32, a mounting plate 36 is attached, which extends in an at least approximately horizontal direction and is attached at the front end of the blade bar 8. The cavity 24 is delimited in downward direction by the mounting plate 36. The installation space 20 is located in the region between the top of the mounting plate 36 and the end wall 32. In this region, the cover profile sheet 26 is placed on the blade angle construction 10 and covers with its legs the cavity 24 located beneath the cover profile sheet 26.

In the exemplary embodiment, the cover profile sheet 26 is designed such that, in its mounting position, its upper rear end overlaps the upper edge 46 of the end wall 32 and also the leg of the cross member 28 in some regions. The cavity 24 continues in this way into the gap formed between the upper rear end of the cover profile sheet 26 and the opposite leg of the cross member 28. In this region, the cover profile sheet 26 forms a raised threshold with respect to the lower edge of the belt conveyor device 12, which serves to passively prevent crops located on the belt conveyor device 12 from falling from the belt conveyor device 12 back onto the soil.

On its side pointing in the working direction, the cover profile sheet 26 has a bead 48 which extends over the length of the cover profile sheet 26 and the bottom of which is lower than a portion of the cover profile sheet 26 that is adjacent in the working direction when the cover profile sheet 26 is in the mounted position. The bead 48 is used for catching grains and ears of corn that would otherwise fall to the soil.

The end wall 32 of the cross member 28 has some outlet openings 38 into which longitudinal tubes 40 are inserted. The longitudinal tubes 40 serve as a support for the support device 14. The support device 14 can consist of a profile strip, the flat side of which is facing up and on which the upper run of the belt conveyor device 12 runs and is supported. The side legs of the profile strip of the support device 14 have cutouts that match the cross-sectional shape of the longitudinal tubes 40. With the cutouts, the profile strip is placed on the longitudinal tubes 40, it is thus held in its installation position with a positive fit. If, in contrast to the embodiment shown in FIG. 2, the angle profile sheet 50 is installed in the installation space 20 instead of the cover profile 26, the longitudinal tubes 40 can be used to direct an air flow 60 from a fan arranged in the rear region of the draper head 2 through the outlet opening 38 into the cavity 24.

The front lower end 42 of the cover profile sheet 26 rests sealingly on the upper side of the mounting plate 36. In this way, no dirt can penetrate into the cavity 24 from the blade bar 8. When the cavity 24 is used as an air duct with an angle profile sheet 50 mounted instead of the cover profile sheet 26, no air can flow out of the cavity 24 in the direction of the blade bar 8 either.

Figure 3:
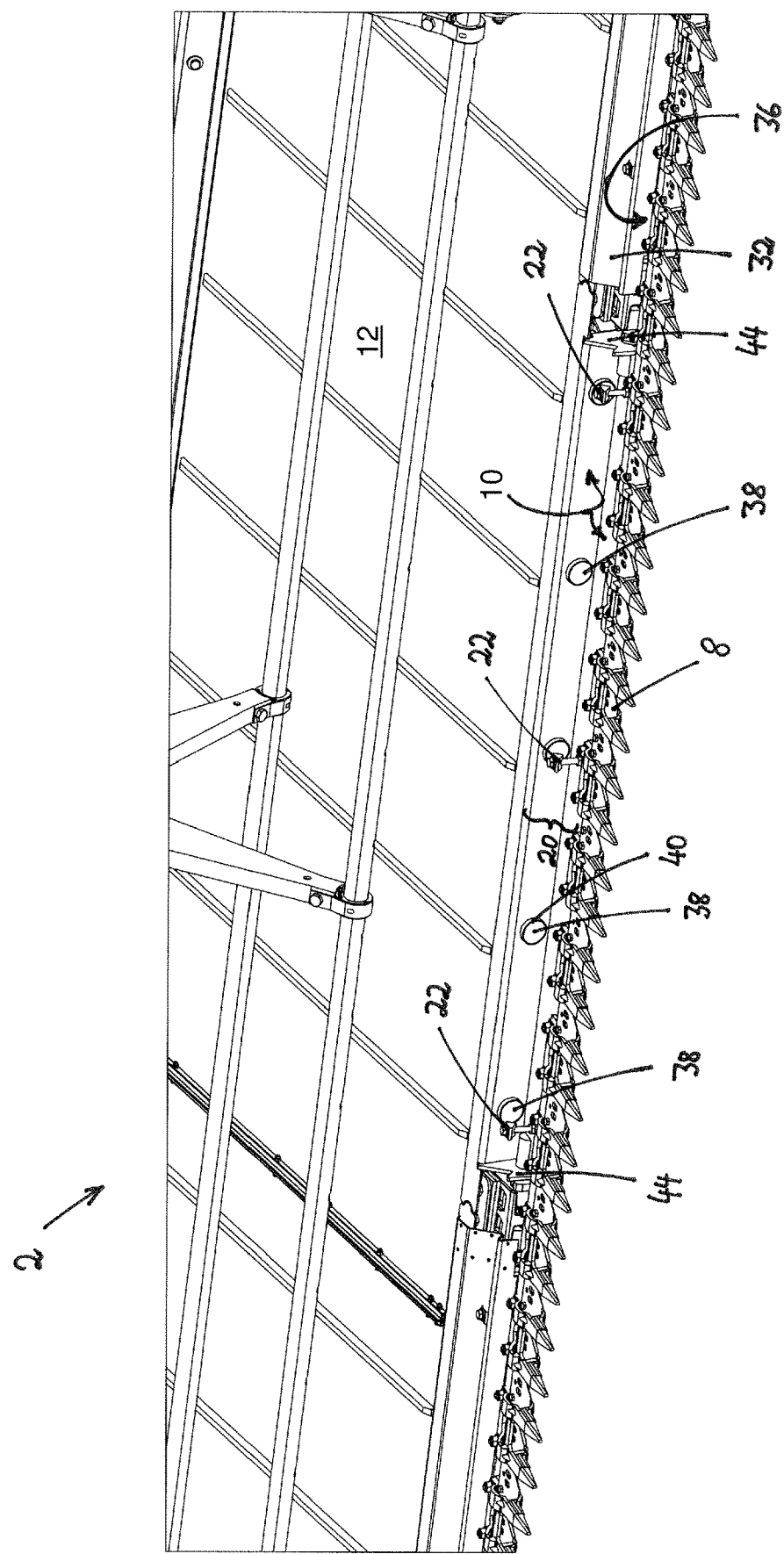
FIG. 3 shows a view of a draper head from the front with removed profile sheets.

In FIG. 3, a view from the front of a draper head 2 with removed profile sheets 26, 50 is shown. The end wall 32 and the mounting plate 36 are clearly visible, which delimit the cavity 24 downwardly and rearwardly with their surfaces. The sealing bodies 44 can also be seen in FIG. 3, onto which a cover profile sheet 26 or an angle profile sheet 50 can be placed. The cavity 24 sealed by the profiles upwardly and toward the front is then delimited in the transverse direction by the sealing bodies 44 so that the air flow 60 cannot exit from the cavity 24 and dirt cannot penetrate from there into the same.

Figure 4:
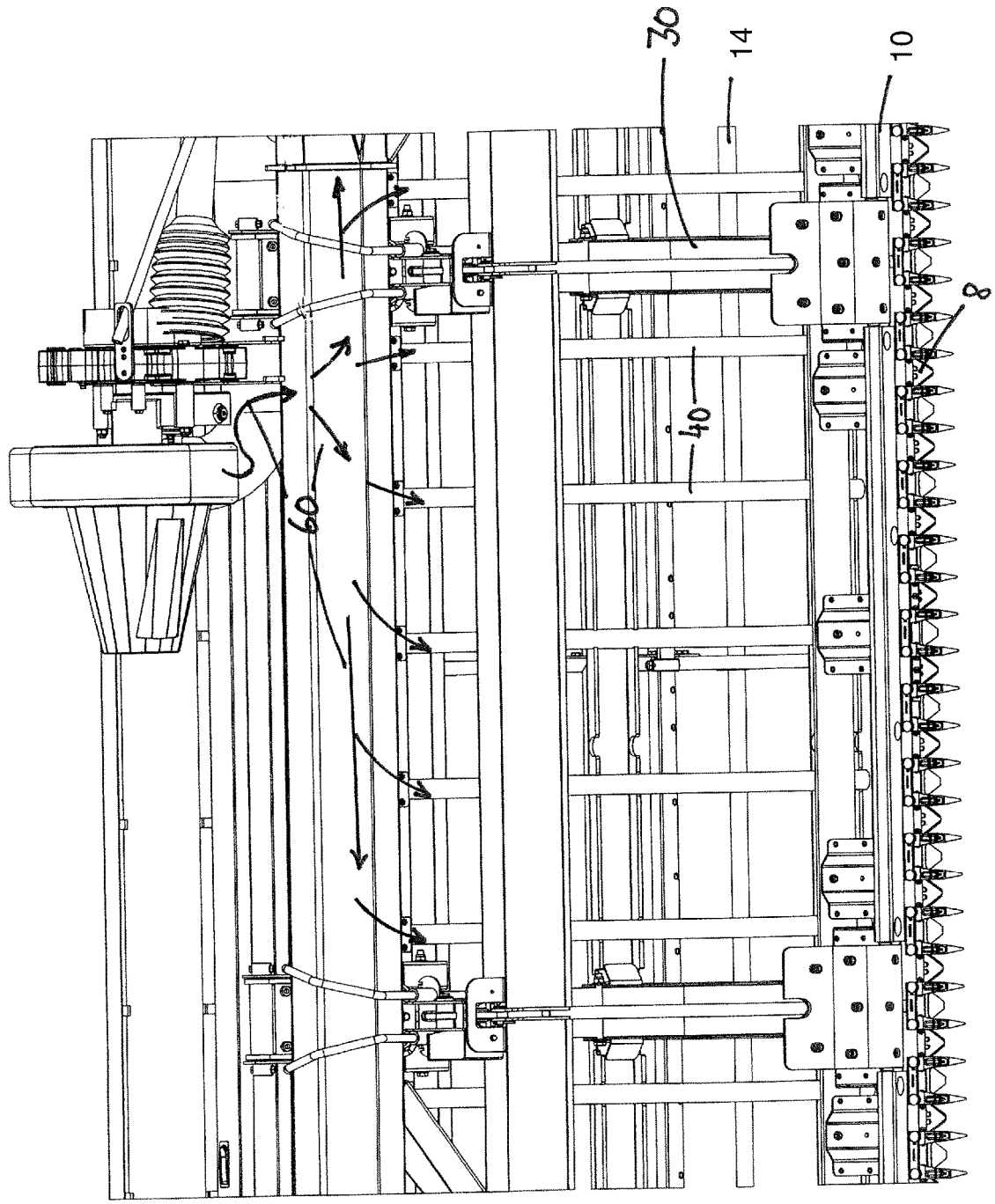
FIG. 4 shows a view of a portion of a draper head from below.

FIG. 4 shows a view of a portion of a draper head 2 from below. In the view from below, the support device 14, the support arms 30, the longitudinal tubes 40, and the blade bar 8 with the blade angle construction 10 are clearly visible. In the rear region of the draper head 2, there is a fan that generates an air flow 60 that enters the longitudinal tubes 40 via a distribution tube, which is oriented transversely to the working direction of the draper head, and is guided from them forwardly into the cavity 24.

Figure 5:
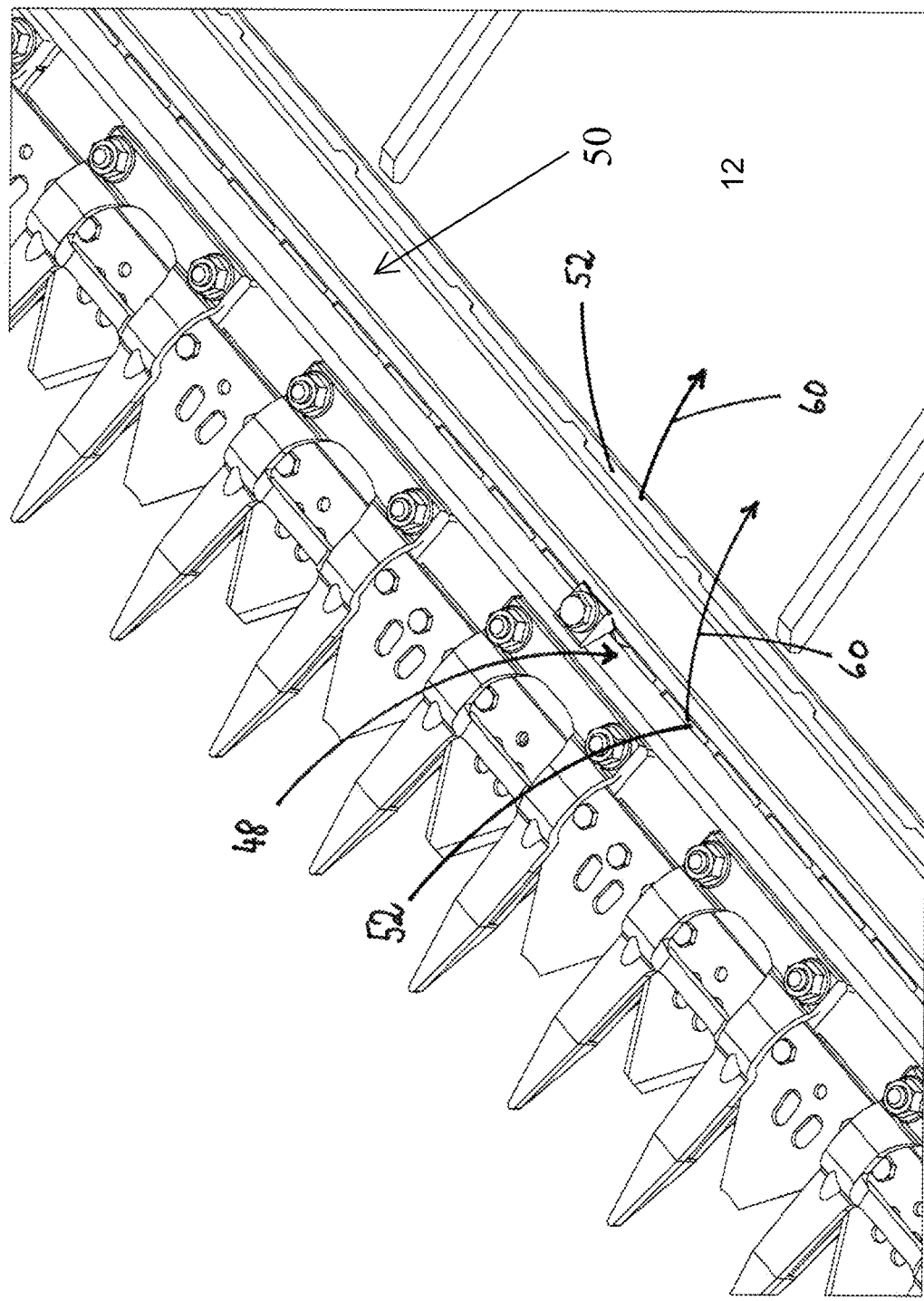
FIG. 5 shows a sectional view of a draper head with inserted angle profile sheet.

FIG. 5 shows a detail view of a draper head 2 with an inserted angle profile sheet 50. The angle profile sheet 50 has a large number of air outlet openings 52. A first row of air outlet openings 52 is located in the bead 48. These air outlet openings 52 can be punched out or lasered out of the angle profile sheet 50. An air flow 60 that enters the cavity 24 through the longitudinal tubes 40 can exit through these air outlet openings 52 to the outside. The cavity 24 distributes the air flow 60 in the transverse direction and serves as an air duct to supply the air to the air outlet openings 52.

Further air outlet openings 52 are located on the rear edge of the angle profile sheet 50. Here, it is sufficient that the rear edge of the angle profile sheet 50 is cut out in a non-straight manner. A part of the air outlet openings 52 formed there is delimited by the leg of the cross member 28 which is folded over rearwardly.

The air outlet openings 52 are positioned and configured to direct an air flow 60 exiting the air duct through the air outlet openings 52 toward the upwardly facing surface of the belt conveyors 12, into an overhead space, and/or in an upward direction.

On its side pointing in the working direction, the angle profile sheet 50 has a bead 48 which extends over the length of the angle profile sheet 50 and the bottom of which is lower than a portion of the angle profile sheet 50 that is adjacent in the working direction when the angle profile sheet 50 is in the mounted position.

When comparing FIGS. 2 and 5, it can be seen that in both illustrations a profiled sheet is inserted into the installation space 20, namely in the case of FIG. 2 the cover profile sheet 26 and in the case of FIG. 5 the angle profile sheet 50. While the cover profiled sheet 26 is closed and in this way completely covers the cavity 24 to the front and in upward direction, the angle profile sheet 50 has air outlet openings 52 through which an air flow 60 can escape in the direction of the belt conveyor device 12. In both cases, the retrofitting interface 18 has been used to cover the region of the blade angle construction 10 in the region of the transition from the blade bar 8 to the belt conveyor device 12. Depending on whether the cover profile sheet 26 or the angle profile sheet 50 is used as the profiled sheet, the draper head 2 has a simple cover in this region, or it is equipped with an active fan with which the harvested crop can be blown in the direction of the belt conveyor device 12.

Figure 6:
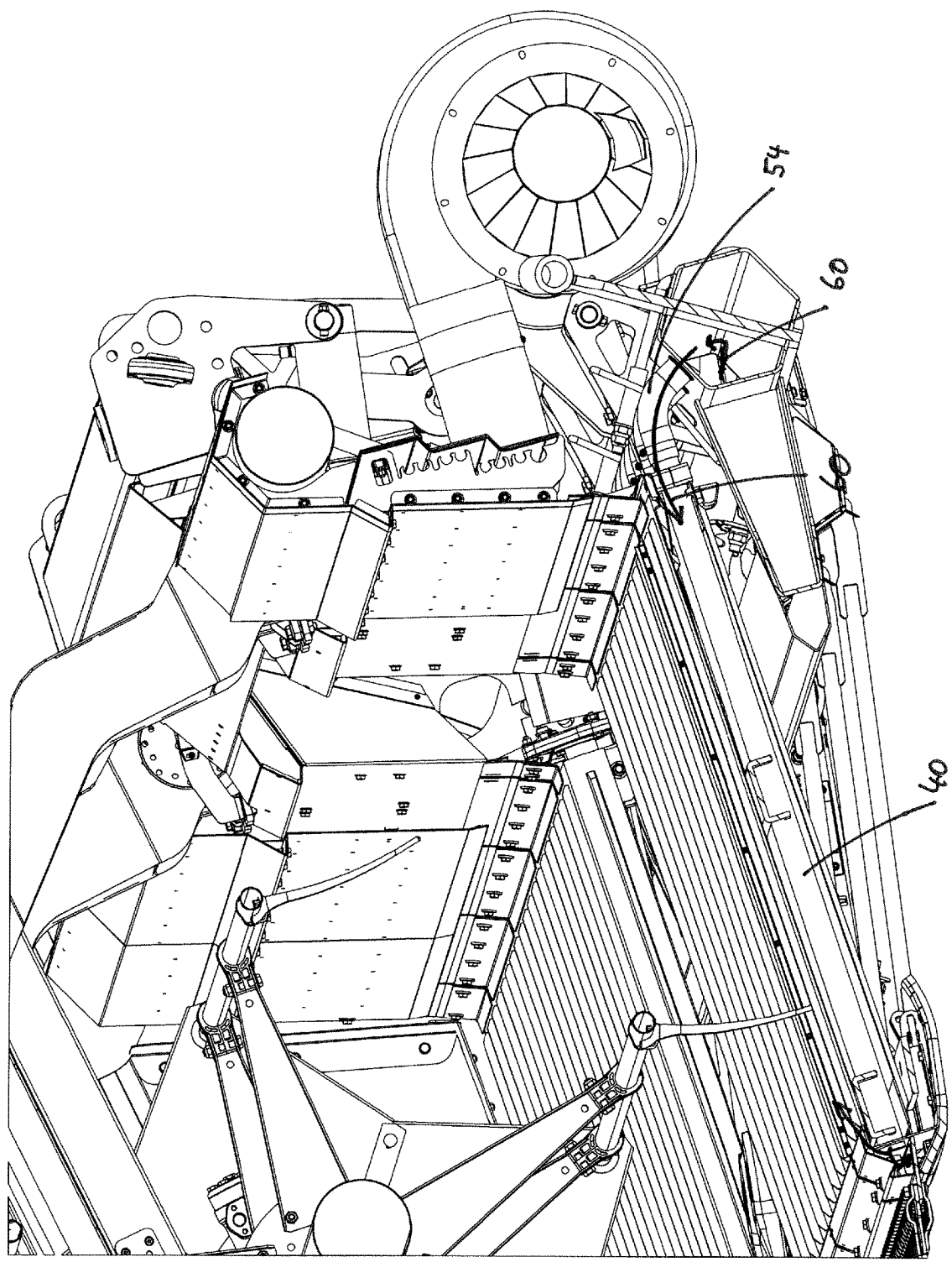
FIG. 6 shows a sectional view of the draper head illustrating the air flow.

In FIG. 6 a sectional view of the draper head 2 to illustrate the air flow is shown. The air flow 60 flows out of the distribution tube via a connecting piece 54 into the longitudinal tube 40. At the front end of the longitudinal tube 40, the air flow 60 is distributed in the cavity 24 as an air duct and flows from there through the air outlet openings 52 in the direction of the belt conveyor device 12.

The specification Incorporates by reference the entire disclosure of German priority document 10 2021 126 683.1 having a filing date of Oct. 14, 2021.

The invention is not limited to the above exemplary embodiments. It appears straightforward for a person skilled in the art to modify the exemplary embodiments in a manner that they deem suitable in order to adapt them to a specific application.

LIST OF REFERENCE NUMERALS 2 draper head
4 harvesting machine
6 frame
8 blade bar
10 blade angle construction
12 belt conveyor device
14 support device
16 drive device
18 retrofitting interface
20 installation space
22 connection point
24 cavity
26 cover profile sheet
28 cross member
30 support arm
32 end wall
34 edge
36 mounting plate
38 outlet opening
40 longitudinal tube
42 front lower end
44 sealing body
46 edge
48 bead
50 angle profile sheet
52 air outlet opening
54 connecting piece
56 slide strip
58 fitting
60 air flow

What is claimed is:

1. A draper head (2) for attachment to a harvesting machine (4), the draper head (2) comprising:
a frame (6), a blade bar (8) disposed at the frame (6), a blade angle construction (10) configured to hold the blade bar (8), belt conveyor devices (12) disposed at the frame (6) and configured to convey the cut stalk material away, a support device (14) configured to support the belt conveyor devices (12), and drive devices (16) configured to drive the blade bar (8) and the belt conveyor devices (12);

a retrofitting interface (18) formed above the blade angle construction (10) and providing an installation space (20) configured to selectively releasably install an angle profile sheet (50) or a cover profile sheet (26) via identical connection points (22);

a cavity (24) located beneath the angle profile sheet (50) or the cover profile sheet (26);

wherein the cavity (24), when using the angle profile sheet (50), serves as an air duct, the angle profile sheet (50) delimiting air outlet openings (52), which are arranged and configured to direct an air flow (60) exiting the air duct through the air outlet openings (52) in a direction toward the upward-facing surface of the belt conveyor devices (12), into an overhead space, and/or in an upward direction; and wherein the cavity (24) is closed when using the cover profile sheet (26).

2. The draper head (2) of claim 1, wherein the angle profile sheet (50) or the cover profile sheet (26) has a bead (48) on a side pointing in the working direction of the draper head (2), wherein the bead (48) extends over a length of the angle profile sheet (50) or the cover profile sheet (26), and wherein a bottom of the bead (48), in the respective mounting position of the angle profile sheet (50) or of the cover profile sheet (26), is arranged lower than a portion of the angle profile sheet (50) or of the cover profile sheet (26) located adjacent to the bead (48) in the working direction of the draper head (2).

3. The draper head (2) of claim 2, wherein the connection points (22) in the region of the bead (48) each comprise a bolt mounted in a fixed position, a clamping piece placed onto the bolt, and a clamping screw clamping the clamping piece from the outside onto the cover profile sheet (26) or onto the angle profile sheet (50), wherein a peripheral contour of the clamping piece is adapted to a three-dimensional shape of the bead (48).

4. A draper head (2) for attachment to a harvesting machine (4), the draper head (2) comprising:

a frame (6), a blade bar (8) disposed at the frame (6), a blade angle construction (10) configured to hold the blade bar (8), belt conveyor devices (12) disposed at the frame (6) and configured to convey the cut stalk material away, a support device (14) configured to support the belt conveyor devices (12), and drive devices (16) configured to drive the blade bar (8) and the belt conveyor devices (12);

a retrofitting interface (18) formed above the blade angle construction (10) and providing an installation space (20) configured to selectively releasably install an angle profile sheet (50) or a cover profile sheet (26) via identical connection points (22);

a cavity (24) located beneath the angle profile sheet (50) or the cover profile sheet (26);

wherein the cavity (24), when using the angle profile sheet (50), serves as an air duct, the angle profile sheet (50) delimiting air outlet openings (52), which are arranged and configured to direct an air flow (60) exiting the air duct through the air outlet openings (52) in a direction toward the upward-facing surface of the belt conveyor devices (12), into an overhead space, and/or in an upward direction;

wherein the cavity (24) is closed when using the cover profile sheet (26);

wherein the blade angle construction (10) has a cross member (28) connected to at least one support arm (30), wherein the at least one support arm (30) is connected to the frame (6), wherein the cross member (28) has an end wall (32) pointing with a flat side thereof in a working direction of the draper head (2);

wherein the end wall (32) is folded over at an upper end thereof opposite to a working direction of the draper head (2) and extends so far rearwardly that the end wall (32) overlaps a front edge (34) of an upper run of the respective belt conveyor device (12) circulating behind the end wall (32);

wherein a mounting plate (36) is fastened to a front side of the end wall (32), wherein the mounting plate (36) extends in an at least approximately horizontal direction and the blade bar (8) is fixed to a front end of the mounting plate (36):

wherein the end wall (32) comprises one or more outlet openings (38) formed above the mounting plate (36);

wherein one or more longitudinal tubes (40) inserted into the one or more outlet openings (38), respectively, wherein the one or more longitudinal tubes (40) extend from a rear of the frame (6) to the end wall (32); and wherein a part of the end wall (32) located above the mounting plate (36) and a side of the mounting plate (36) facing upwardly delimit spatially a region of the retrofitting interface (18).

5. The draper head (2) of claim 4, wherein the angle profile sheet (50) or the cover profile sheet (26) is held in the respective mounting position via the connection points (22) with a front lower end (42) thereof sealingly on an upper side of the mounting plate (36) in a region between a rear end of the blade bar (8) and the end wall (32) and extends from the upper side of the mounting plate (36) to at least approximately a maximum height of the end wall (32) and, viewed in a longitudinal direction opposite to the working direction of the draper head (2), extends as far as at least approximately to the end wall (32) or so as to overlap the end wall (32) in said longitudinal direction.

6. The draper head (2) of claim 5, wherein the angle profile sheet (50) in the respective mounting position completely encloses the cavity (24) in the working direction of the draper head (2), wherein the cavity (24) is sealed outwardly at end faces thereof by sealing bodies (44) covering a cross section of end faces of the angle profile sheet (50), and wherein the cavity (24) is delimited downwardly and rearwardly at least in regions by the end wall (32) and the mounting plate (36).

7. The draper head (2) of claim 6, wherein a rear end of the angle profile sheet (50) in the respective mounting position overlaps an upper edge (46) of the end wall (32), and wherein air outlet openings (52) are formed in a portion of the angle profile sheet (50) overlapping the end wall (32).

8. The draper head (2) of claim 4, wherein the angle profile sheet (50) in the respective mounting position completely encloses the cavity (24) in the working direction of the draper head (2), wherein the cavity (24) is sealed outwardly at end faces thereof by sealing bodies (44) covering a cross section of end faces of the angle profile sheet (50), and wherein the cavity (24) is delimited downwardly and rearwardly at least in regions by the end wall (32) and the mounting plate (36).

9. The draper head (2) of claim 4, wherein the one or more longitudinal tubes (40) have connecting pieces (54) configured to introduce an air flow (60) generated by a fan of the draper head (2) into an interior of the one or more longitudinal tubes (40), wherein the one or more longitudinal tubes (40) are a component of an air conveying system configured to guide the air flow (60) through the interior into a region of the one or more outlet openings (38), and wherein the one or more longitudinal tubes (40) form a part of the support device (14) in that slide strips (56) are placed on the one or more longitudinal tubes (40), wherein the slide strips (56) extend in a direction transverse to the working direction of the draper head (2) and are configured to have an upper run of the belt conveyors (12) slide thereon during circulation of the belt conveyors (12).

* * * * *